US012801765B2

(12) United States Patent
Jung et al.

(10) Patent No.: US 12,801,765 B2
(45) Date of Patent: Nov. 17, 2026

(54) METHOD OF SECURELY STORING CRITICAL INFORMATION

(71) Applicants: HYUNDAI MOTOR COMPANY, Seoul (KR); KIA CORPORATION, Seoul (KR); HYUNDAI AUTOEVER CORP., Seoul (KR)

(72) Inventors: Ho-Jin Jung, Hwaseong-si (KR); Seung-Yeon Jeong, Hwaseong-si (KR); Jong-Won Hong, Gwacheon-si (KR); Young-June Lee, Anyang-si (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 75 days.

(21) Appl. No.: 18/943,460

(22) Filed: Nov. 11, 2024

(65) Prior Publication Data

US 2025/0190600 A1 Jun. 12, 2025

(30) Foreign Application Priority Data

Dec. 7, 2023 (KR) ........................ 10-2023-0176718

(51) Int. Cl.

*G06F 21/00* (2013.01)
*G06F 21/62* (2013.01)
*H04L 9/08* (2006.01)
*H04L 9/32* (2006.01)

(52) U.S. Cl.

CPC ........ *G06F 21/6209* (2013.01); *H04L 9/0825* (2013.01); *H04L 9/3247* (2013.01); *G06F 2221/2141* (2013.01)

(58) Field of Classification Search

None

See application file for complete search history.

(56) References Cited

U.S. PATENT DOCUMENTS

| | | | | |
|---|---|---|---|---|
| 8,069,298 | B2 * | 11/2011 | Chang | G06F 21/10 711/147 |
| 9,119,070 | B2 * | 8/2015 | Brindza | H04W 12/122 |
| 9,621,550 | B2 * | 4/2017 | Chew | G06F 21/30 |
| 9,635,028 | B2 * | 4/2017 | Shepard | G06F 21/44 |
| 9,767,275 | B2 * | 9/2017 | Krisna | G06F 21/53 |
| 10,970,706 | B2 * | 4/2021 | Quentin | G06Q 20/40145 |
| 11,231,991 | B2 | 1/2022 | Heo | |

(Continued)

FOREIGN PATENT DOCUMENTS

KR 20200038145 A 4/2020

*Primary Examiner* — Maung T Lwin
(74) *Attorney, Agent, or Firm* — Lempia Summerfield Katz LLC

(57) ABSTRACT

Proposed is a method of efficiently storing critical information in a secure place within a hardware security module. The method includes: generating, by a host, access control request information for requesting control of access to a secure data piece associated with at least one application program when the at least one application program is executed; authenticating, by a security module, the at least one application program according to the access control request information; and processing, by the security module, the access control request information according to a result of the authenticating.

10 Claims, 4 Drawing Sheets

(56) References Cited

U.S. PATENT DOCUMENTS

| | | | | |
|---|---|---|---|---|
| 2005/0200714 | A1* | 9/2005 | Marchese | G06F 16/5838<br>348/E7.086 |
| 2020/0104208 | A1 | 4/2020 | Heo | |
| 2022/0027487 | A1* | 1/2022 | Kim | G06F 21/602 |

* cited by examiner

METHOD OF SECURELY STORING CRITICAL INFORMATION

CROSS-REFERENCE TO RELATED APPLICATIONS

This application claims priority to Korean Patent Application No. 10-2023-0176718, filed on Dec. 7, 2023, which is incorporated herein by reference in its entirety.

BACKGROUND

Technical Field

The present disclosure relates to a secure storage technology, and more particularly, to a method capable of efficiently storing critical information in a safe place within a hardware security module by performing an address-based access control.

Description of Related Art

Security threats increase with vehicle electrification and advanced performance. There is also an increasing need for security requirements against the security threats. Accordingly, a system-on-chip (SoC) semiconductor device is configured to include a hardware security module (HSM) for security of a control unit.

The HSM is a region which is physically (logically) separated from a host system and cannot be accessed by the host system. The HSM and the host system communicate with each other using inter-process communication (IPC).

The HSM is used to store various security keys and to receive a host system's request for a cryptographic algorithm or a secure application. The HSM processes this request and returns the resulting value.

Recently, there has been an increasing number of control units that generate, store, and manage personal information, critical data pieces available within a vehicle, and the like.

Typically, critical data pieces available within the control unit can be stored in an encrypted manner through an HSM key and a cryptographic algorithm. However, in a case where it is possible to access the control unit through hacking, data pieces can be acquired by dumping the hacked portion of the control unit, or can be maliciously used by other vehicles.

In addition, because data pieces are present in a host region, they may be deleted by unexpected access or reprogramming.

In addition, a problem arises in that it takes too much time to check data pieces after booting, due to data decoding, media access control (MAC), or electronic signature verification.

SUMMARY

One object of the present disclosure, which is proposed to address the above-mentioned problems, is to provide a method capable of efficiently storing critical information in a safe storage region within a hardware security module.

Another object of the present disclosure is to provide a method capable of ensuring the integrity and confidentiality of critical information under any circumstances.

Still another object of the present disclosure is to provide a method capable of removing an unnecessary operation from a host.

According to one aspect of the present disclosure, a method capable of efficiently storing critical information in a safe storage region within a hardware security module is provided in order to accomplish the above-mentioned objects.

The method includes: generating, by a host, access control request information for requesting control of access to a secure data piece associated with at least one application program when the at least one application program is executed; authenticating, by a security module, the at least one application program according to the access control request information; and processing, by the security module, the access control request information according to a result of the authenticating.

In the method, the host and the security module may be physically or logically separated from each other, and establish a communication connection therebetween through a communication means.

In the method, the authenticating by the security module may include: receiving, by a management unit of the security module, the access control request information; and authenticating the management unit, whether or not a request for control of access to the secure data piece that is stored in a storage region is effective, using an access table having information associated with the secure data piece.

In the method, the authenticating by the security module may include renewing, by the management unit, the access table when a change to the at least one application program is made.

In the method, the storage region may be a separate storage space provided within the security module in such a manner that the host does not have direct access thereto.

In the method, the authenticating may be performed based on address information of the at least one application program.

In the method, the authenticating may be performed by comparing address information of the at least one application program and address information stored in the access table with each other.

In the method, the address information may have a unique value that is distinguishable according to the at least one application program.

In the method, the authenticating by the security module may include: checking, by the security module, whether or not update information is an effective electronic signature, using a public key that is stored in the storage region; and updating, by the security module, authority information within the storage region or transmitting, by the security module, an error return message, according to a result of the checking.

In the method, the public key may be pre-provisioned from the outside and is stored in the storage region.

In the method, in the processing by the security module, according to a result of the authenticating, the security module may process the access control request information only for an application program that successfully passes the authentication among the application programs.

According to another aspect of the present disclosure, a method of securely storing critical information is provided, where the method includes: generating, by a host, access control request information for requesting control of access to a secure data piece associated with at least one application program when the at least one application program is executed; detecting, by a security module, counterfeit or falsification of the at least one application program according to the access control request information; authenticating, by the security module, the at least one application program according to a result of the detecting; and processing, by the security module, the access control request information according to a result of the authenticating.

In the method, the detecting by the security module may include pre-generating, by the security module, media access control (MAC) information for identification, based on a pre-provisioned private key, using a data piece corresponding to a size associated with a specific address range of the at least one application program.

In the method, the detecting may be performed by comparing address information of the at least one application program and the MAC information with each other.

The present disclosure is directed to a technology for safely protecting data pieces in a host system through user authentication based on features of a hard security module (HSM) and an address (an address of an application program of the host system). This technology can simply provide a secure storage function in an embedded system.

In addition, another effect of the present disclosure is that critical information that is handled in the host can be stored within an HSM secure storage region without undergoing a complex process such as encryption, media access control (MAC), or an electronic signature, thereby achieving high performance.

In addition, still another effect of the present disclosure is that an encrypted file can be stored within a hardware security module (HSM) instead of a host region, thereby preventing data deletion due to user mistakes and similar errors.

In addition, yet another effect of the present disclosure is that a secure storage function that uses address-based authentication can maintain its high security by utilizing an HSM-based function of detecting counterfeit or falsification in real time.

DETAILED DESCRIPTION

Figure 1:
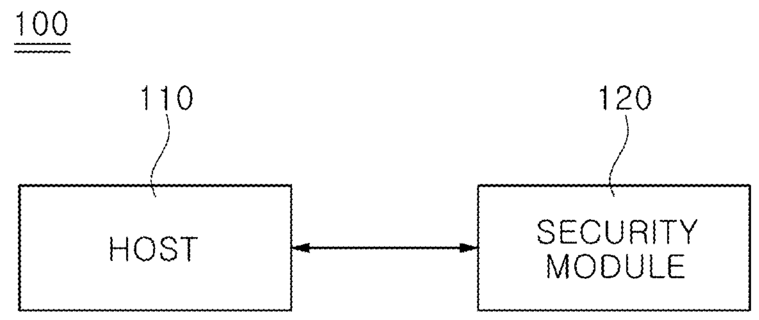
FIG. 1 is a conceptual diagram illustrating a system on chip (SoC) according to a first embodiment of the present disclosure.

The objects, features, and advantages of the present disclosure, which are mentioned above, are described in detail below with reference to the accompanying drawings, and, from this description, the technical idea of the present disclosure should be readily implemented by a person of ordinary skill in the art to which the present disclosure pertains. In a case where a specific description of the well-known technology associated with the present disclosure is determined as unnecessarily making the nature and gist of the present disclosure obfuscated, a detailed description thereof has been omitted from the description of the present disclosure.

Embodiments of the present disclosure are described in detail below with reference to the accompanying drawing. The same reference numbers are used in the drawings to indicate the same or similar constituent elements.

FIG. 1 is a conceptual diagram illustrating a system on chip (SoC) 100 according to a first embodiment of the present disclosure. With reference to FIG. 1, the system on chip 100 may be configured to include a host 110 and a security module 120. The host 110 performs a function of executing an application program.

For security of a control unit, the security module 120 is separately configured on the system on chip 110. In other words, within the control unit, the host 110 and the security module 120 may be configured in the form of a system on chip. The security module 120 stores various secure keys, and performs functions of processing a request by the host 110 for a cryptographic algorithm and a secure application and transferring resulting values in response.

Examples of the control unit may include an electronic control unit (ECU), a hybrid control unit (HCU), a motor control unit (MCU) and the like. Of course, the control unit may be a high-level control unit.

The host 110 and the security module 120 are physically or logically separated from each other and establish a communication connection between them. Inter-process communication (IPC) is used for communication between them.

Figure 2:
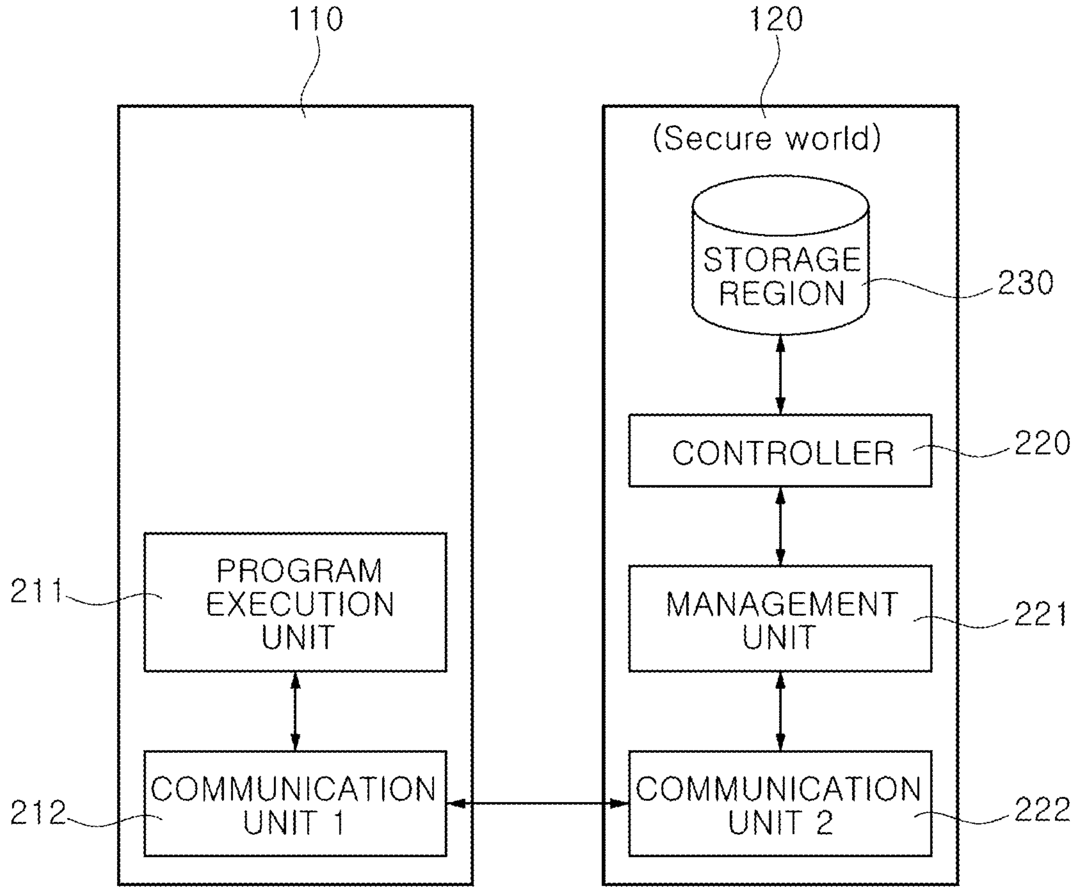
FIG. 2 is a block diagram of a detailed configuration of the system on chip illustrated in FIG. 1, according to one embodiment of the present disclosure.

FIG. 2 is a block diagram of a detailed configuration of the system on chip 100 illustrated in FIG. 1. With reference to FIG. 2, the host 110 may be configured to include a program execution unit 211, a first communication unit 212, and the like. The program execution unit 211 performs a function of executing an application program. Typically, the application program is recorded and remains constant in memory in an embedded system, and a physical address of the application program in the memory is not changed until the next update version of the application program is recorded.

A vehicular embedded system operates using an executable-in-place (XIP) technique in which a program is directly executed from memory in which the program is stored. Therefore, a location address and an operating address of the program in the memory are the same. Therefore, an operating address is constant and may serve as a unique value that distinguishes one application program from another application program located at a different address in memory.

An operating address value having this feature is used as an access authority authentication element. In other words, authentication for storing in a storage region 230 of an HSM 120 is performed based on address information of different application programs. Therefore, only an application program authenticated for authority is allowed to access a critical data piece, and thus the data confidentiality can be ensured.

In addition, the moment the critical data pieces of the host 110 are stored in the storage region 230, the integrity of the critical data piece can be guaranteed.

The first communication unit 212 performs communication with a second communication unit 222 and performs a function of transmitting and receiving a data piece to and from the second communication unit 222. To this end, the first and second communication units 212 and 222 each may be configured to include a processor, a communication circuit, and the like.

The security module 120 may be configured to include a management unit 221, a controller 220, the second communication unit 222, and the storage region 230. The management unit 221 may perform a function of performing authentication and updating authority information.

The controller 220 performs a function of recording a data piece requested in the storage region 230 or reading a data piece requested from the storage region 230 according to the result of the authentication by the management unit 221.

The second communication unit 222 performs a function of establishing a communication connection to the first communication unit 212. Therefore, the first communication unit 212 and the second communication unit 222 maintain a communication connection to each other and perform communication between processors of the host 110 and the security module 120.

The storage region 230 performs a function of securely storing a data piece that is based on address information of an application program. The storage region 230 is configured with a nonvolatile memory, but is not limited thereto. The storage region 230 may be configured with a volatile memory or a combination of a nonvolatile memory and a volatile memory.

A flash memory is primarily used as the nonvolatile memory, but the nonvolatile memory is not limited thereto. Examples of the nonvolatile memory may include an electrically erasable programmable read-only memory (EEPROM), a static RAM (SRAM), a ferro-electric RAM (FRAM), a phase-change RAM (PRAM), a magnetic RAM (MRAM), and the like. Examples of the volatile memory may include a dynamic random access memory (DRAM), a synchronous dynamic random access memory (SDRAM), a double data rate-SDRAM (DDR-SDRAM), and the like.

The program execution unit 211, the management unit 221, the controller 220, and the like that are illustrated in FIG. 2 are entities that perform at least one function or operation, and may be realized in software and/or hardware. The program execution unit 211, the management unit 221, the controller 220, and the like may be realized in hardware as an application-specific integrated circuit (ASIC), a digital signal processing (DSP), a programmable logic device (PLD), a field programmable gate array (FPGA), a processor, a microprocessor, a different electronic unit, or a combination of these that are designed to perform the functions described above.

The program execution unit 211, the management unit 221, the controller 220, and the like may be realized in software as software applications. The software applications each may contain software constituent components (elements), object-oriented software constituent components, class constituent components, task constituent components, processes, functions, attributes, procedures, sub-routines, program code segments, drivers, firmware, micro-codes, data pieces, databases, data structures, tables, arrangements, and variables.

Figure 3:
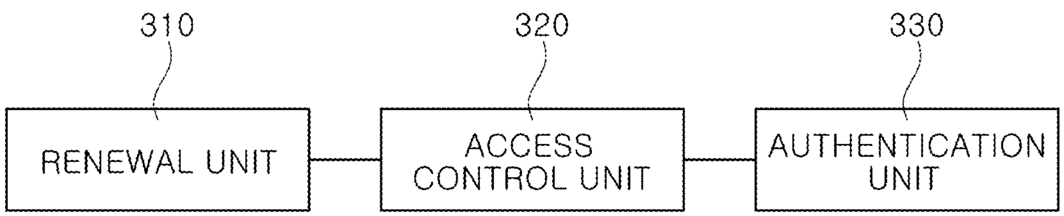
FIG. 3 is a block diagram of a detailed configuration of a management unit illustrated in FIG. 2, according to one embodiment of the present disclosure.

FIG. 3 is a block diagram of a detailed configuration of the management unit 221 illustrated in FIG. 2. With reference to FIG. 3, the management unit 221 may be configured to include a renewal unit 310, an access control unit 320, an authentication unit 330, and the like.

The renewal unit 310 performs a function of updating a table for access to the storage region 230 when access authority, an access address, and the like are changed due to an update (i.e., reprogramming) in the host 110.

The access control unit 320 receives access control request information for requesting control of access to a data piece from the program execution unit 211 of the host 110 and performs a function of processing the access control request information. The access control request information includes permissions and the like to read, write, and delete.

The authentication unit 330 performs a function of verifying whether or not a request for control of access to a secure data piece in the storage region 230 is effective, using the access table. Of course, the authentication unit 330 can verify information in the access table, which is transferred from the host 110. Address-based authentication information for this verification can be generated out of the control unit.

The renewal unit 310, the access control unit 320, and the authentication unit 330, which are illustrated in FIG. 3, each contain software constituent components (elements), object-oriented software constituent components, class constituent components, task constituent components, processes, functions, attributes, procedures, sub-routines, program code segments, drivers, firmware, micro-codes, circuits, data pieces, databases, data structures, tables, arrangements, and variables.

Figure 4:
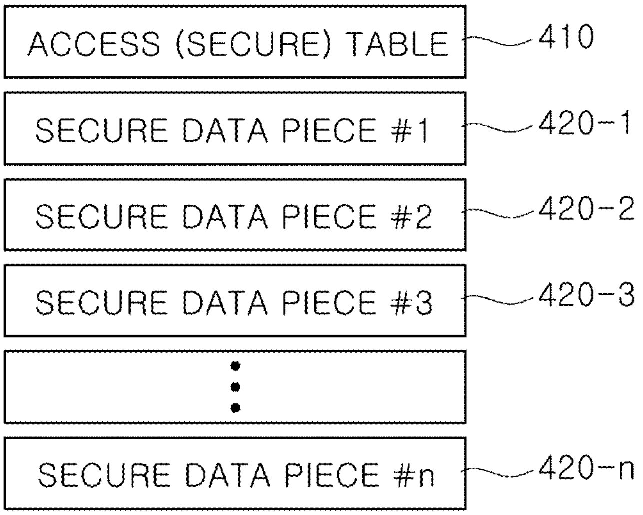
FIG. 4 is a diagram illustrating a data structure that is stored in a storage region illustrated in FIG. 2, according to one embodiment of the present disclosure.

FIG. 4 is a diagram illustrating a data structure that is stored in the storage region 230 illustrated in FIG. 2. With reference to FIG. 4, an access table 410 is configured. Address information of an application program, information on physical addresses at which first to n-th secure data pieces 420-1 to **420-*n* are recorded, and identification information for identifying the physical address information are configured in the access table 410**.

The first to n-th secure data pieces 420-1 to **420-*n* are stored at physical positions in the storage region 230. Therefore, the first to n-th secure data pieces 420-1 to 420-*n*** have fixed physical addresses and are not changed until updated.

The storage region 230 is a separate storage space inside the security module 120, and the host 110 cannot have direct access to the storage region 230. Therefore, the host 110 can access the storage region 230 after the security module 120 finishes a procedure for authentication of the host 110 through communication means, i.e., the first and second communication units 212 and 222. In other words, when the host 110 requests the authentication unit 330 to perform a secure storage function, the authentication unit 330 performs the secure storage function through the access table 410 within the storage region 230 based on an address of the application program in question. The secure storage function is to execute a command for renewing information including permissions and the like to write, read, and delete the first to n-th secure data pieces 420-1 to **420-*n* within the storage region 230**.

When an address of the host 110 is changed, the access table 410 within the storage region 230 is changed through the renewal unit 310.

Figure 5:
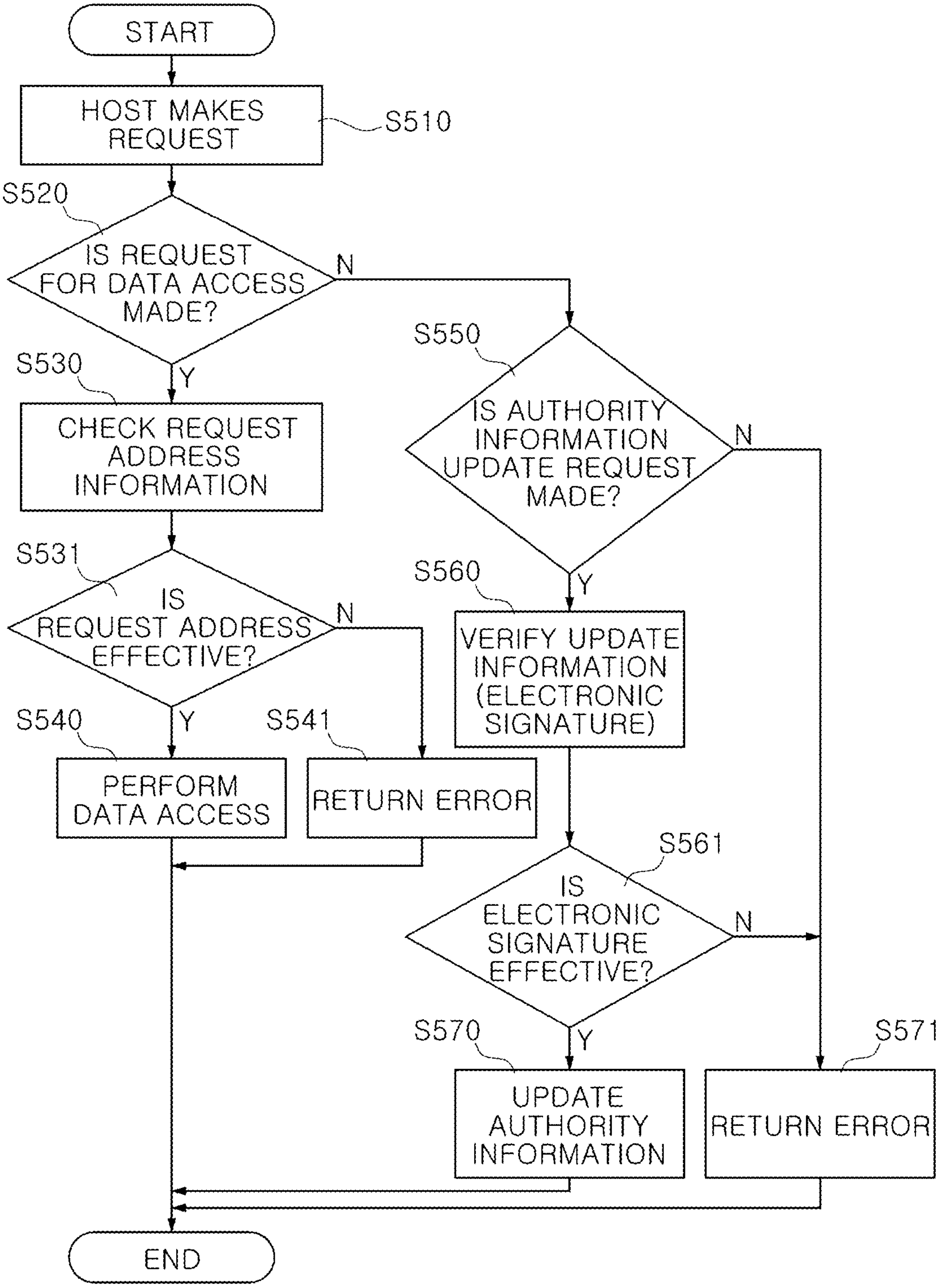
FIG. 5 is a flowchart illustrating a process of performing a secure storage function according to a second embodiment of the present disclosure.

FIG. 5 is a flowchart illustrating a process of performing the secure storage function according to a second embodiment of the present disclosure. With reference to FIG. 5, the host 110 generates the access control request information for requesting control of access to the first to n-th secure data pieces 420-1 to **420-*n* (Step S510). In other words, the program execution unit 211 of the host 110 issues a command for updating the permissions and the like to write, read, and delete the first to n-th secure data prices 420-1 to 420-*n* within the storage region 230**, through a related application programming interface (API) in a currently running application program.

Subsequently, the security module 120 checks whether or not a data access request is contained in the access control request information from the host 110 (Step S520).

When the result of the checking in Step S520 is that the data access request is contained in the access control request information, the security module 120 checks request address information (Step S530). In other words, the security module 120 checks address information of an application program.

Subsequently, the security module 120 checks whether or not the checked address information is on an effective address (Step S531). In other words, the address information of the requested application program is compared with address information stored in the access table.

When the result of the checking in Step S531 is that the address information is on an effective address, the security module 120 performs data access (Step S540). Therefore, changing and the like of the permissions to write, read, and delete the first to n-th secure data pieces 420-1 to **420-*n*** can be performed.

Conversely, when the result of the checking in Step S531 is not that the address information is on an effective address, the security module 120 transmits an error return message to a high-level control unit through the host 110 (Step S541).

When the result of the checking in Step S520 is not that the data access request is contained in the access control request information, the security module 120 checks whether or not an authority information update request is contained in the access control request information (Step S550).

When the result of the checking in Step S550 is not that the authority information update request is contained in the access control request information from the host 110, the security module 120 transmits an error return message to a high-level control unit through the host 110 (Step S571).

Conversely, when the result of the checking in Step S550 is that the authority information update request is contained in the access control request information from the host 110, the security module 120 verifies update information (i.e., an electronic signature) (Step S560). The electronic signature is generated externally. To verify the electronic signature, the security module 120 is pre-provisioned with a shared public key from an electronic signature management server (not illustrated). Of course, this public key is stored in the storage region 230.

Subsequently, in Step S561, the security module 120 checks whether or not the electronic signature is effective, using the public key (Step S561).

When the result of the checking in Step S561 is not that the electronic signature is effective, the security module 120 transmits an error return message to a high-level control unit through the host 110 (Step S571).

Conversely, when the result of the checking in Step S561 is that the electronic signature is effective, the security module 120 updates the authority information (Step S570). In other words, in a case where the verification of the electronic signature is successful, the security module 120 conducts an effectiveness inspection on the access table, and then updates the final authority information within the storage region 230.

Figure 6:
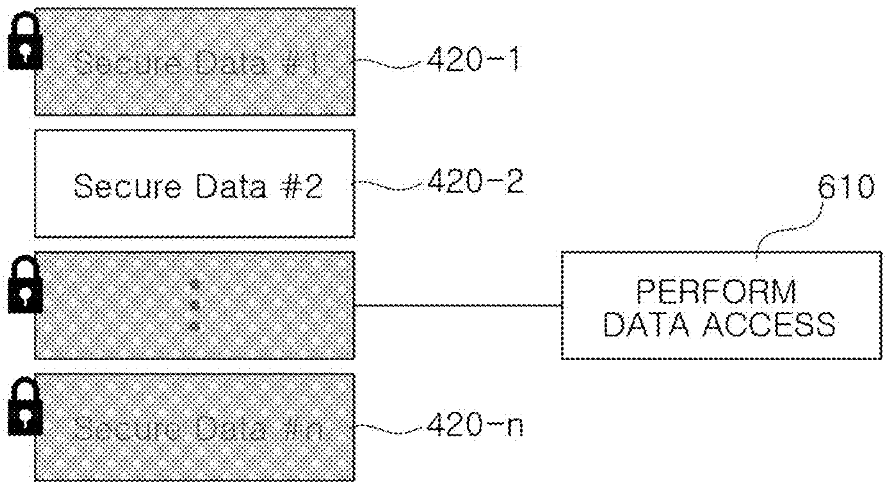
FIG. 6 is a conceptual diagram illustrating a step of having access to a data piece, which is illustrated in FIG. 5, according to one embodiment of the present disclosure.

FIG. 6 is a conceptual diagram illustrating Step S540 of conducting access to a data piece, which is illustrated in FIG. 5. With reference to FIG. 6, access to the second secure data piece 420-2 is conducted (610). In this case, except for the second secure data 420-2, the first and third to n-th secure data pieces 420-1 and 420-3 to **420-*n*** are encrypted, and access to them is not allowed.

Figure 7:
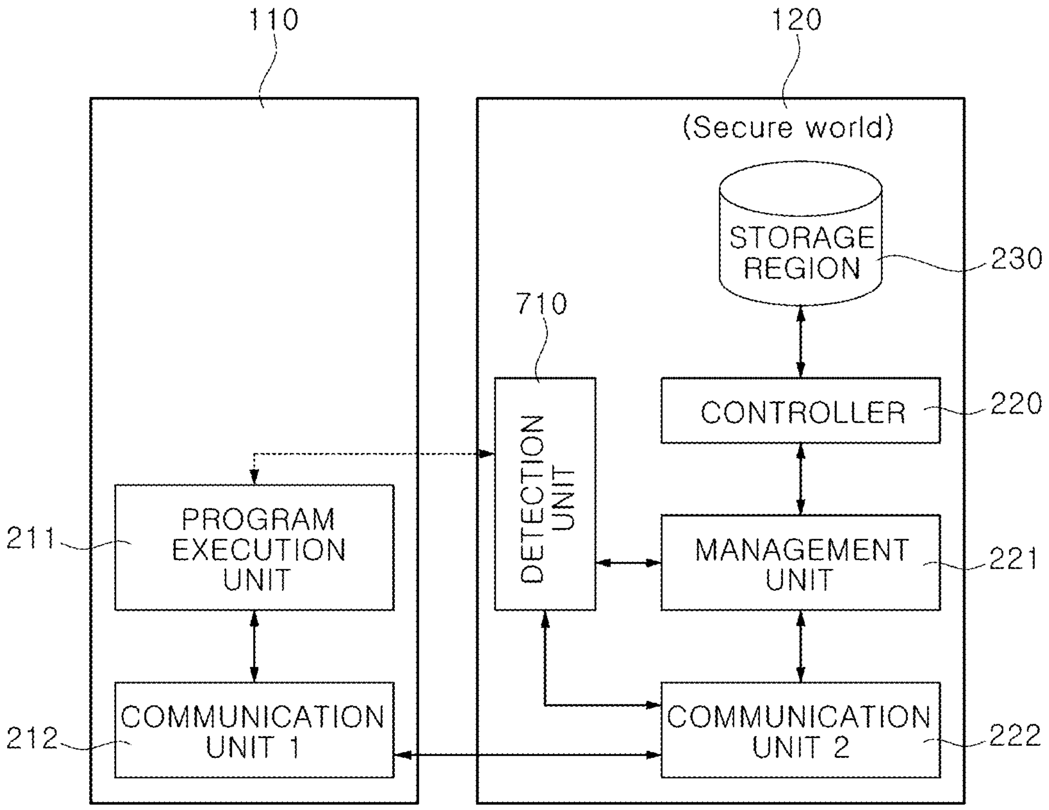
FIG. 7 is a conceptual diagram illustrating a system on chip (SoC) according to a third embodiment of the present disclosure.

FIG. 7 is a conceptual diagram illustrating a system on chip (SoC) according to a third embodiment of the present disclosure. With reference to FIG. 7, the security module 120 performs access control that is based on an execution address of the host 110. Therefore, it is assumed that a code of the address in question is not changed.

A function of detecting counterfeit or falsification in real time can be additionally performed. With reference to FIG. 7, a detection unit 710 that detects the counterfeit or falsification in real time is configured in the security module 120. The detection unit 710 detects the counterfeit or falsification in real time after the control unit is booted.

To this end, a data piece corresponding to a size associated with a specific address range is pre-transferred to the security module 120. Based on this data piece, the security module 120 generates media access control (MAC) information for identification, using a pre-provisioned private key.

When a request to perform the secure storage function is received from the address in question, the detection unit 710 operates first and checks integrity by comparing the media access control (MAC) information and a requested address with each other. Then, only when there is no abnormality in integrity, the next operation can be performed. Accordingly, the security of address-based authentication information can be ensured.

The other constituent elements are the same as those described with reference to FIG. 2, and thus descriptions thereof are omitted.

The method or algorithm steps, which are described in associated with the embodiments disclosed in this specification may be implemented in the form of program commands executable through various computer components, such as a microprocessor, a processor, and a central processing unit. Therefore, the method or algorithm steps may be recorded on a computer-readable medium. A program (command) code, a data file, a data structure, and the like are recorded individually or in combination on the computer-readable recording medium.

What is claimed is:

1. A method of securely storing a secure data piece, the method comprising:

generating, by a host, access control request information for requesting control of access to the secure data piece associated with at least one application program wherein the control access is executed by the at least one application program;

authenticating, by a security module, the at least one application program according to the access control request information; and processing, by the security module, the access control request information according to a result of the authenticating and accessing to the secure data piece, wherein the authenticating by the security module comprises:

receiving, by a management unit of the security module, the access control request information; and authenticating the management unit, whether or not a request for control of access to the secure data piece that is stored in a storage region is effective, using an access table having information associated with the secure data piece, wherein the associated information comprises at least one of address information of the at least one application program, information on physical addresses which the secure data piece is recorded, or identification information for identifying the physical address information, and wherein the authenticating by the security module comprises:

checking, by the security module, whether or not update information is an effective electronic signature, using a public key that is stored in the storage region; and updating, by the security module, authority information within the storage region or transmitting, by the security module, an error return message, according to a result of the checking.

2. The method of claim 1, wherein the host and the security module are physically or logically separated from each other, and establish a communication connection therebetween.

3. The method of claim 1, wherein the authenticating by the security module comprises:

renewing, by the management unit, the access table when a change to the at least one application program is made.

4. The method of claim 1, wherein the storage region is a separate storage space provided within the security module in such a manner that the host does not have direct access thereto.

5. The method of claim 4, wherein the authenticating is performed based on address information of the at least one application program.

6. The method of claim 5, wherein the authenticating is performed by comparing address information of the at least one application program and address information stored in the access table with each other.

7. The method of claim 6, wherein the address information has a unique value that is distinguishable according to the at least one application program.

8. The method of claim 1, wherein the public key is pre-provisioned from outside of the storage region and is stored in the storage region.

9. The method of claim 1, wherein in the processing by the security module, according to a result of the authenticating, the security module processes the access control request information only for the at least one application program that successfully passes the authentication among the application programs.

10. A method of securely storing a secure data piece, the method comprising:

generating, by a host, access control request information for requesting control of access to the secure data piece associated with at least one application program when the at least one application program is executed;

detecting, by a security module, counterfeit or falsification of the at least one application program according to the access control request information;

authenticating, by the security module, the at least one application program according to a result of the detecting;

processing, by the security module, the access control request information according to a result of the authenticating; and pre-generating, by the security module, media access control (MAC) information for identification, based on a pre-provisioned private key, using a data piece corresponding to a size associated with a specific address range of the at least one application program, wherein the detecting is performed by comparing address information of the at least one application program and the media access control (MAC) information with each other.

* * * * *